United States Patent
Cirulli et al.

(10) Patent No.: US 8,032,408 B2
(45) Date of Patent: Oct. 4, 2011

(54) CONTRACT ASSOCIATION METHOD AND SYSTEM

(75) Inventors: Susan Bumgardner Cirulli, Simpsonville, SC (US); Andrew Coleman, Vestal, NY (US)

(73) Assignee: International Business Machines Corporation, Armonk, NY (US)

( * ) Notice: Subject to any disclaimer, the term of this patent is extended or adjusted under 35 U.S.C. 154(b) by 1195 days.

(21) Appl. No.: 11/740,477

(22) Filed: Apr. 26, 2007

(65) Prior Publication Data

US 2008/0270149 A1  Oct. 30, 2008

(51) Int. Cl.
*G06Q 30/00* (2006.01)
(52) U.S. Cl. ............................................... 705/9; 705/8
(58) Field of Classification Search .................. 705/8, 9
See application file for complete search history.

(56) References Cited

U.S. PATENT DOCUMENTS

| | | | |
|---|---|---|---|
| 5,197,004 A | 3/1993 | Sobotka et al. | |
| 5,551,880 A | 9/1996 | Bonnstetter et al. | |
| 6,857,877 B1 | 2/2005 | Watanabe | |
| 7,043,443 B1 | 5/2006 | Firestone | |
| 7,054,821 B1 | 5/2006 | Rosenthal et al. | |
| 7,080,057 B2 | 7/2006 | Scarborough et al. | |
| 2001/0042000 A1* | 11/2001 | Defoor, Jr. | 705/9 |
| 2003/0182171 A1* | 9/2003 | Vianello | 705/9 |
| 2007/0214035 A1* | 9/2007 | Walsh et al. | 705/9 |
| 2007/0239512 A1* | 10/2007 | Scott | 705/9 |
| 2008/0172415 A1* | 7/2008 | Fakhari et al. | 707/104.1 |

* cited by examiner

*Primary Examiner* — Nga B. Nguyen
(74) *Attorney, Agent, or Firm* — Schmeiser, Olsen & Watts; William E. Schiesser (57) ABSTRACT

A contract association method and system. The method includes receiving, by a computing system from a requester, a command for creating a service request. The computing system places restrictions on accessing contracts associated with suppliers. The computing system receives a selection of a first requested skill from the requester. The computing system selects a group of contracts applicable to a group of suppliers. The computing system generates a service request document comprising a selection of a first supplier from the group of suppliers, a first contract of the group of contracts, and the first requested skill.

36 Claims, 8 Drawing Sheets

CONTRACT ASSOCIATION METHOD AND SYSTEM

FIELD OF THE INVENTION

The present invention relates to a method and associated system for associating a plurality of skills with pre-negotiated contracts.

BACKGROUND OF THE INVENTION

Selecting individuals from various entities to perform functions within an organization typically comprises an inefficient process with little flexibility. Typically, entities provide detailed information associated with the individuals. The detailed information may include resumes, pay rate requests, and lists of skills. Viewing and processing the detailed information may be very tedious and time consuming. Accordingly, there exists a need in the art to overcome the deficiencies and limitations described herein above.

SUMMARY OF THE INVENTION

The present invention provides a contract configuration method comprising:
receiving, by a computing system from a requester, a command for creating a service request, said computing system comprising a memory device, said memory device comprising a list of skills, a first list of suppliers, and supplier contract data, said supplier contract data comprising contracts applicable to said first list of suppliers, said requester affiliated with a specified company;
determining, by said computing system, which contracts of said contracts are regionally specific contracts;
placing, by said computing system, restrictions on said contracts, said restrictions for allowing only specified parties to access said contracts;
receiving, by said computing system from said requester, a selection of a first skill on said list of skills;
filtering, by said computing system, a group of suppliers on said list of suppliers, said group of suppliers comprising potential suppliers for supplying candidates comprising said first skill, said group of suppliers filtered based on a plurality of business factors;
generating, by said computing system, a second list of suppliers, said second list of suppliers identifying said group of suppliers;
selecting, by said computing system, a group of contracts of said contracts, said group of contracts applicable to said second list of suppliers, said group of contracts selected based on a plurality of filtering factors;
determining, by said computing system, that said restrictions allow said requester to access said group of contracts;
generating, by said computing system, a selection list comprising identifiers for said group of contracts and said second list of suppliers;
presenting, by said computing system for said requester, said selection list;
receiving, by said computing system from said requester, a first selection of a first supplier and a first associated contract of said selection list;
generating, by said computing system, a service request document, said candidate request document comprising said first selection of said first supplier and said first contract and said selection of said first skill; and
transmitting, by said computing system, said service request document to said first supplier.

The present invention provides a computing system comprising a processor coupled to a computer-readable memory unit, said memory unit comprising instructions that when executed by the processor implement a contract configuration method, said method comprising:
receiving, by said computing system from a requester, a command for creating a service request, said memory unit further comprising a list of skills, a first list of suppliers, and supplier contract data, said supplier contract data comprising contracts applicable to said first list of suppliers, said requester affiliated with a specified company;
determining, by said computing system, which contracts of said contracts are regionally specific contracts;
placing, by said computing system, restrictions on said contracts, said restrictions for allowing only specified parties to access said contracts;
receiving, by said computing system from said requester, a selection of a first skill on said list of skills;
filtering, by said computing system, a group of suppliers on said list of suppliers, said group of suppliers comprising potential suppliers for supplying candidates comprising said first skill, said group of suppliers filtered based on a plurality of business factors;
generating, by said computing system, a second list of suppliers, said second list of suppliers identifying said group of suppliers;
selecting, by said computing system, a group of contracts of said contracts, said group of contracts applicable to said second list of suppliers, said group of contracts selected based on a plurality of filtering factors;
determining, by said computing system, that said restrictions allow said requester to access said group of contracts;
generating, by said computing system, a selection list comprising identifiers for said group of contracts and said second list of suppliers;
presenting, by said computing system for said requester, said selection list;
receiving, by said computing system from said requester, a first selection of a first supplier and a first associated contract of said selection list;
generating, by said computing system, a service request document, said service request document comprising said first selection of said first supplier and said first contract and said selection of said first skill; and
transmitting, by said computing system, said service request document to said first supplier.

The present invention provides a process for supporting computer infrastructure, said process comprising providing at least one support service for at least one of creating, integrating, hosting, maintaining, and deploying computer-readable code in a computing system, wherein the code in combination with the computing system is capable of performing a contract configuration method, said method comprising:
receiving, by said computing system from a requester, a command for creating a service request, said computing system comprising a memory device, said memory device comprising a list of skills, a first list of suppliers, and supplier contract data, said supplier contract data comprising contracts applicable to said first list of suppliers, said requester affiliated with a specified company;
determining, by said computing system, which contracts of said contracts are regionally specific contracts;
placing, by said computing system, restrictions on said contracts, said restrictions for allowing only specified parties to access said contracts;
receiving, by said computing system from said requester, a selection of a first skill on said list of skills;

filtering, by said computing system, a group of suppliers on said list of suppliers, said group of suppliers comprising potential suppliers for supplying candidates comprising said first skill, said group of suppliers filtered based on a plurality of business factors;

generating, by said computing system, a second list of suppliers, said second list of suppliers identifying said group of suppliers;

selecting, by said computing system, a group of contracts of said contracts, said group of contracts applicable to said second list of suppliers, said group of contracts selected based on a plurality of filtering factors;

determining, by said computing system, that said restrictions allow said requester to access said group of contracts;

generating, by said computing system, a selection list comprising identifiers for said group of contracts and said second list of suppliers, wherein each supplier of said second list of suppliers is associated with at least one contract of said second group of contracts;

presenting, by said computing system for said requester, said selection list;

receiving, by said computing system from said requester, a first selection of a first supplier and a first associated contract of said selection list;

generating, by said computing system, a service request document, said service request document comprising said first selection of said first supplier and said first contract and said selection of said first skill; and transmitting, by said computing system, said service request document to said first supplier.

The present invention provides a computer program product, comprising a computer usable medium comprising a computer readable program code embodied therein, said computer readable program code adapted to implement a contract configuration method within a computing system, said method comprising:

receiving, by said computing system from a requester, a command for creating a service request, said computer usable medium further comprising a list of skills, a first list of suppliers, and supplier contract data, said supplier contract data comprising contracts applicable to said first list of suppliers, said requester affiliated with a specified company;

determining, by said computing system, which contracts of said contracts are regionally specific contracts;

placing, by said computing system, restrictions on said contracts, said restrictions for allowing only specified parties to access said contracts;

receiving, by said computing system from said requester, a selection of a first skill on said list of skills;

filtering, by said computing system, a group of suppliers on said list of suppliers, said group of suppliers comprising potential suppliers for supplying candidates comprising said first skill, said group of suppliers filtered based on a plurality of business factors;

generating, by said computing system, a second list of suppliers, said second list of suppliers identifying said group of suppliers;

selecting, by said computing system, a group of contracts of said contracts, said group of contracts applicable to said second list of suppliers, said group of contracts selected based on a plurality of filtering factors;

determining, by said computing system, that said restrictions allow said requester to access said group of contracts;

generating, by said computing system, a selection list comprising identifiers for said group of contracts and said second list of suppliers;

presenting, by said computing system for said requester, said selection list;

receiving, by said computing system from said requester, a first selection of a first supplier and a first associated contract of said selection list;

generating, by said computing system, a service request document, said service request document comprising said first selection of said first supplier and said first contract and said selection of said first skill; and transmitting, by said computing system, said service request document to said first supplier.

The present invention advantageously provides a method and associated system capable of selecting individuals from various entities to perform functions within an organization.

DETAILED DESCRIPTION OF THE INVENTION

Figure 1:
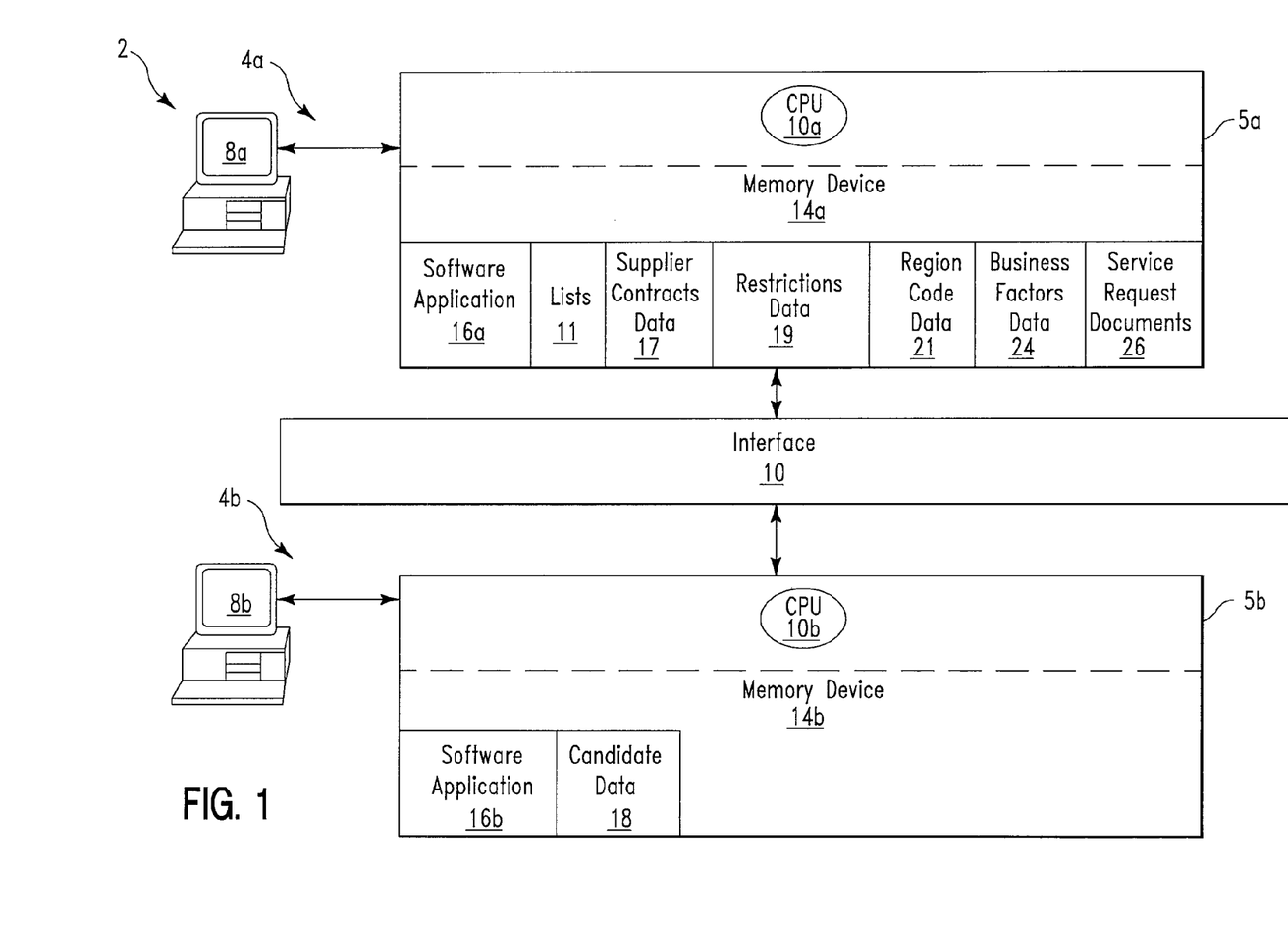
FIG. 1 illustrates a block diagram of a system 2 for generating a service request comprising contract associations, in accordance with embodiments of the present invention.

FIG. 1 illustrates a block diagram of a system 2 for generating a service request comprising contract associations, in accordance with embodiments of the present invention. System 2 allows a requester to associate selected skills with a plurality of contracts associated with suppliers of candidates or resources. A service request is defined herein as a request (i.e., requested by a requester from a requesting company) for contract services (e.g., job functions) to be performed by a contractor. The contractor is selected from a plurality of eligible candidates provided by a supplier. The contractor may be sourced or contracted from any location or country (e.g., globally) regardless of where the need for services is identified. A requester is defined herein as a person/people (e.g., users from an entity such as, inter alia, an organization, a company, etc.) looking for a resource or contractor (i.e., a person/people procured from a third party supplier with a specific skill(s) to perform job functions). A resource will perform job functions for a requesting organization. The resource is actually an employee of the supplier and not the requesting company. A contract is defined herein as a document that specifies an agreement for a supplier to provide certain goods or services (i.e., contractors) at a specific rate. A contract comprises line items, which are handled like a mini-catalog. System 2 generates a service request document (e.g., service request documents 26). A service request document comprises a request document generated by a requester and transmitted to a supplier. The service request document comprises a request that is generated in order to obtain contracted technical, administrative, or business service candidates for filling a contractor position. A service request document may comprise one or more line items, each of which indicates a type of skill required as selected from a corporate taxonomy (i.e., a method of organizing jobs and associated skills). System 2 performs a process to: configure a contract for appropriate access, identify a skill required (i.e., for a contractor), associate that skill with the configured contract, and continue the association through supplier interaction and purchase order creation. Software application 16a and 16b in computing system 5a and 5b in combination comprise the following functional components:

1. A contract generation tool—A contract generation tool allows a contract to be generated based on buyer (i.e., a person that prepares purchase orders, negotiates with suppliers, etc.) negotiations. Additionally, the contract generation tool creates a purchase order which is transmitted to a supplier for fulfillment.
2. A front-end skills purchasing tool—A front-end skills purchasing tool allows a requester to identify requested skills and allows suppliers to post candidate descriptions and resumes in response to those skills requests. Additionally, the front-end skills purchasing tool supports requester authorization for candidate(s) hiring. For example, if the candidate is a former employee, a human resource department must authorize the hiring as a contractor.
3. A front-end purchasing tool—The front-end purchasing tool allows a requester to create a shopping cart with items (services or other types of goods), assigns accounting functions, and obtains management approval for the expenditure.
4. A contractor tracking tool—The contractor tracking tool tracks the hours claimed by hired contractors.

System 2 comprises a computing system 4a (e.g., a server) connected to a computing system 4b (e.g., a server) through an interface 10. Interface 10 may comprise any type of interface known to a person of ordinary skill in the art including, inter alia, a local area network, (LAN), a wide area network (WAN), the Internet, etc. Computing system 4a comprises a computing apparatus 5a and an interface terminal 8a. Computing system 4b comprises a computing apparatus 5b and an interface terminal 8b. Computing apparatus 5a comprises a CPU 10a and a memory device 14a. Alternatively, memory device 14a may be located external to computing apparatus 5a. Memory device 14a comprises a software application 16a, lists 11, supplier contracts data 17 (i.e., comprising contracts), restrictions data 19, regional code data 21, business factors data 24, and service request documents 26. Lists 11, supplier contracts data 17, restrictions data 19, regional code data 21, business factors data 24, and service request documents 26 may be inputted into computing apparatus 5a through interface terminal 8a. Computing apparatus 5b comprises a CPU 10b and a memory device 14b. Alternatively, memory device 14b may be located external to computing apparatus 5b. Memory device 14b comprises a software application 16b and candidate data 18. Candidate data 18 may be inputted into computing apparatus 5b through interface terminal 8b.

Figure 2:
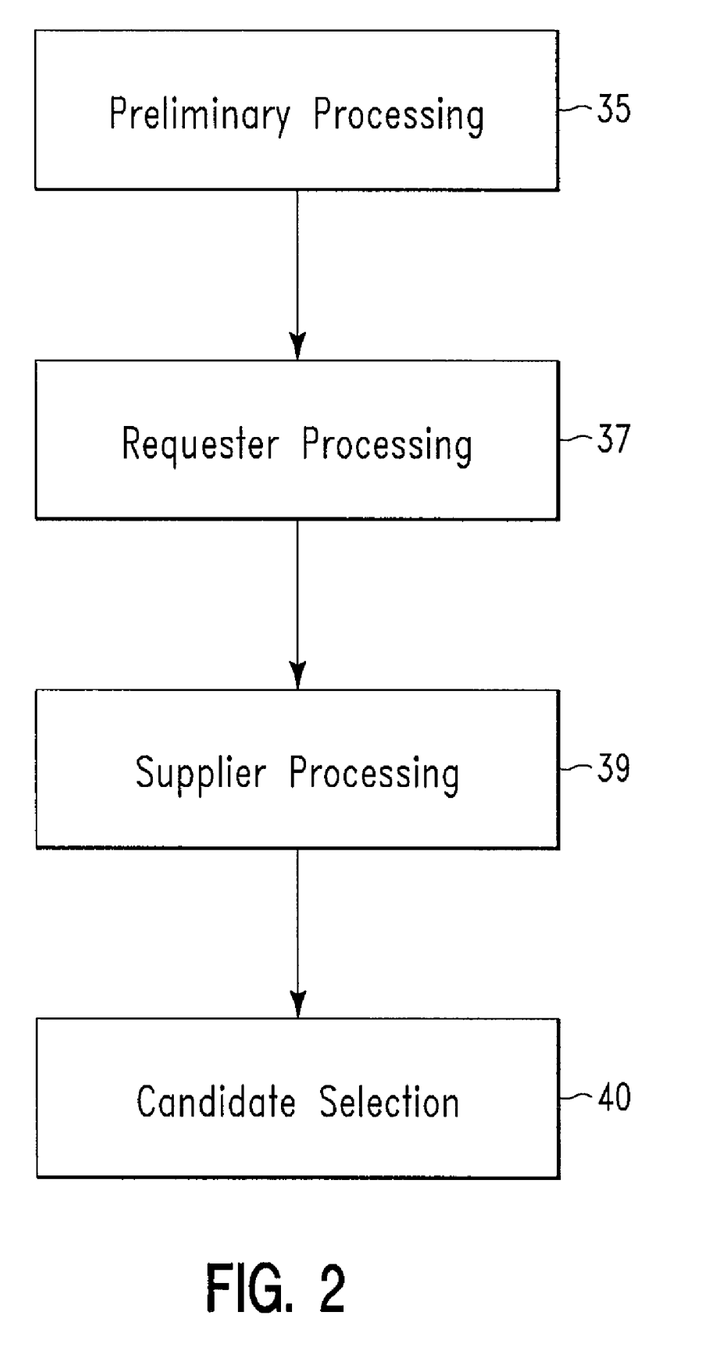
FIG. 2 illustrates a flowchart describing an overall algorithm used by system 2 of FIG. 1 for generating a service request, in accordance with embodiments of the present invention.

FIG. 2 illustrates a flowchart describing an overall algorithm used by system 2 of FIG. 1 for generating a service request, in accordance with embodiments of the present invention. In step 35, preliminary processing is executed (see FIG. 3, infra). Preliminary processing includes inputting and configuring supplier contracts. In step 37, requester functions are performed (see FIG. 4, infra). Requester functions include selecting requested skills, supplier contracts, and associated suppliers. In step 39, supplier functions are performed (see FIG. 5, infra). In step 40, the requester selects candidates (see FIG. 6, infra).

Figure 3:
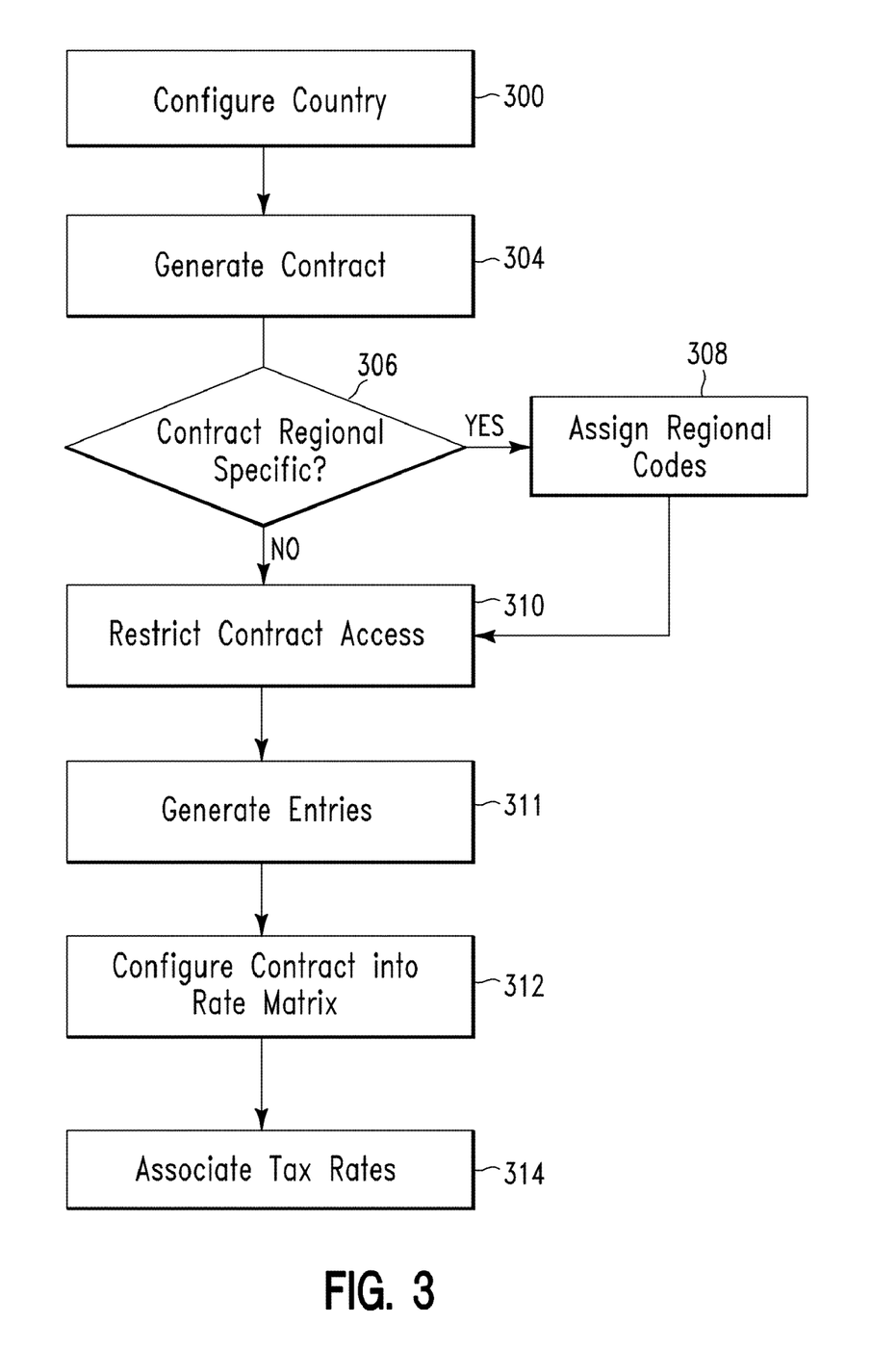
FIG. 3 illustrates a flowchart detailing a first step of FIG. 2, in accordance with embodiments of the present invention.

FIG. 3 illustrates a flowchart detailing step 35 of FIG. 2, in accordance with embodiments of the present invention. In step 300, an administrator configures a country for use of region-code filtering. Additionally, a country may be configured to use a specified contract, if only one contract is configured for that supplier. In some countries, if a specified supplier has agreed to a specified contract (with special rates), then the country will require the use of the specified contract associated with the specified supplier. In alternative countries, a requester may use the specified supplier without using the specified contract. In step 304, a contract is generated by a buyer and the contract is inputted into computing apparatus 5a. A contract may comprise multiple line items. Each line item represents a different skill and skill level that the supplier may provide (e.g., a junior-level programmer). Each line item also comprises an associated commodity code (i.e., a code describing a method of grouping items (e.g., skills) to be purchased) along with a short description of the skill. In step 306, it is determined if any the contracts being inputted into computing apparatus 5a require an associated region code (i.e., are any the contracts regional specific?). This is accomplished via a country configuration.

If in step 306 it is determined that the country is configured for the contract, then in step 308 computing apparatus 5a will load the regional code from each contract for line item and the process executes step 310 as described, infra. Note that each line item in the contract may comprise the regional code as the first 2 characters in its description. Therefore, a contract line item for a junior-level programmer in Ontario, Calif., may comprise a description of "ON Junior programmer".

If in step 306 it is determined that the country is not configured for the contract, then in step 310 an administrator using computing apparatus 5a configures the contract for use by software application 16a. The contract may also be configured to limit its use by country, company, department, work location, business unit, and/or user web id. The contract may be associated with special services that are available for only one department to hire. For example, a special rate for electricians would be available in Dallas only for a special construction project that department 1198 is working on. Additionally, the administrator may also indicate if the contract can be used only for internal services requests, only for external service requests, or any combination thereof. This allows for controlling special access to contracts. In step 311, entries in a table for contract line items of the contract is generated. The contract line items are sorted by regions. In step 312, the administrator may ensure that the contract is configured into a rate matrix. A rate matrix is defined herein as a matrix generated for configuring supplier rates that have been negotiated by country, currency, supplier, region, job role, etc. The rate matrix is used when the supplier responds to a request in order to determine if his/her response is within the matrix or if an exception pricing process must be followed. Additionally, the rate matrix is used for calculating an overall price of the line item(s).

By entering the contract rates into the rate matrix, the administrator ensures that the contract may be used by software application 16a. This will be the rate used, if a requester elects to use a contract for his/her request. In step 314, different tax rates are associated with different labor rates and the regions.

Figures 4, 4A:
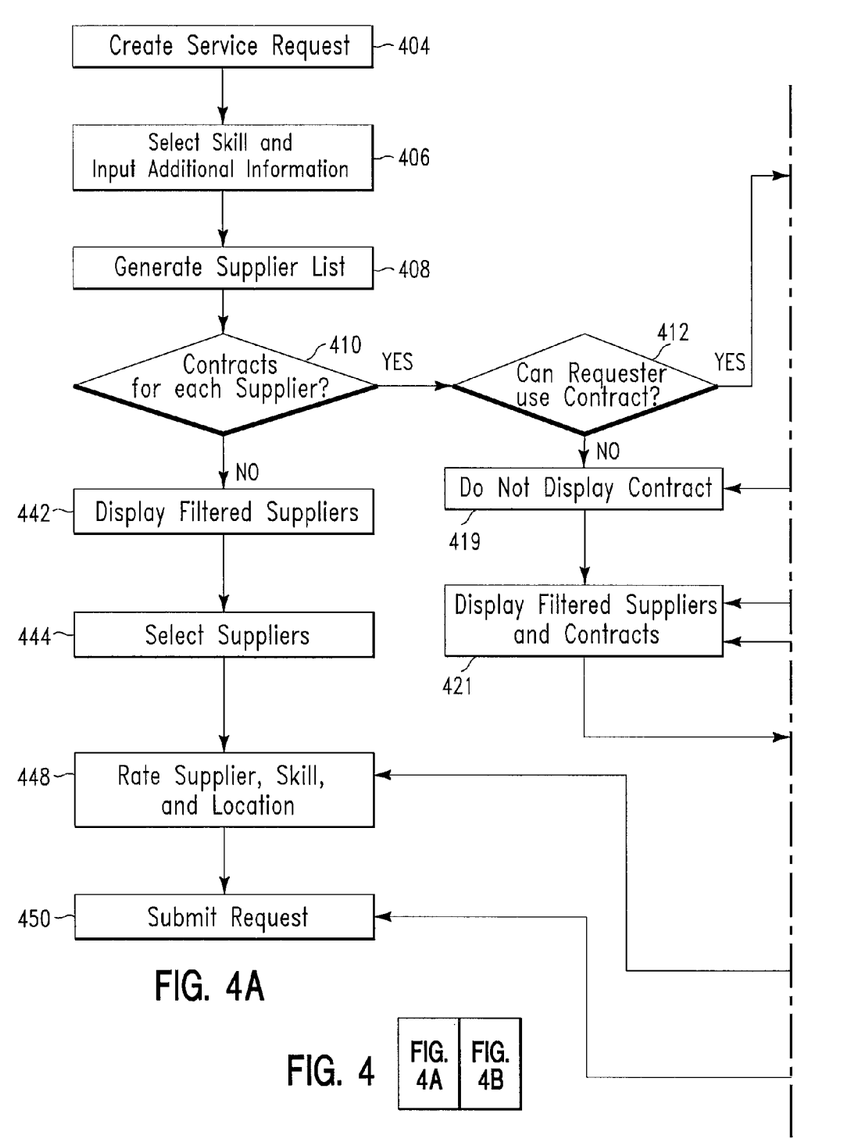
FIGS. 4A and 4B in combination illustrates a flowchart detailing a second step of FIG. 2, in accordance with embodiments of the present invention.
Figure 4B:
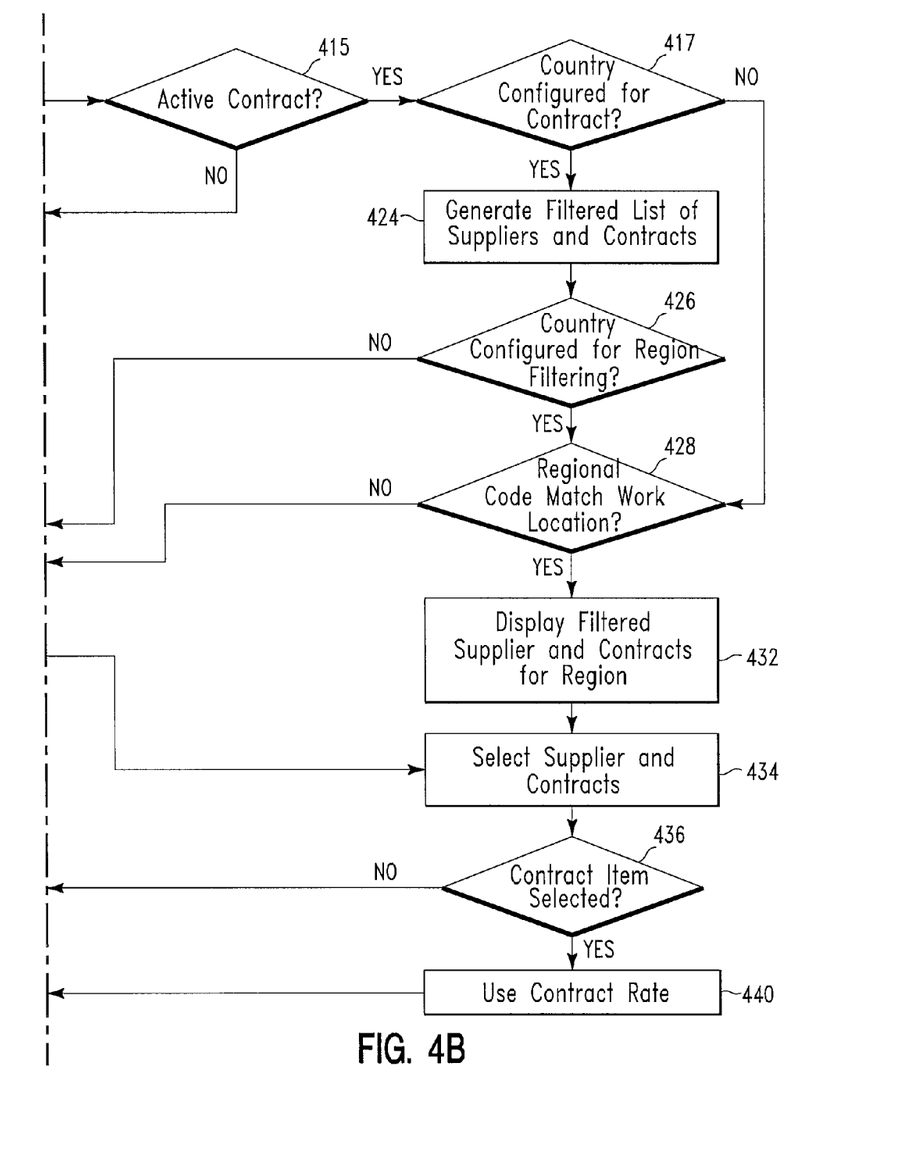

FIGS. 4A and 4B in combination illustrates a flowchart detailing step 37 of FIG. 2, in accordance with embodiments of the present invention. In step 404, a requester wanting to hire services generates a service request. In step 406 the requester enters a skill line item to the request and identifies where the work (i.e., for the requested skill(s) needs to take place. In step 408, software application 16a builds a list of potential suppliers for the line item entered in step 406. The list of suppliers is based on the request's country, company, business unit, work location and service type of the line item request. In step 410, software application 16a builds a list of contracts and contract line items that may be used for on the supplier(s) identified and the list of contracts is filtered to determine if each supplier is associated with any of the contracts.

If in step 410, it is determined that some suppliers are not associated with any of the contracts then in step 442, the system displays a filtered list of suppliers for the requester to select from. In step 444, the requester selects a supplier(s) and the algorithm proceeds to step 448 (i.e., described, infra).

If in step 410, it is determined that all suppliers are associated with some of the contracts then in step 412, the list of contracts is filtered to determine if there are any requester restrictions placed on the list of contracts. Software application 16a looks at the type of request and sees if any of the following matches:
1. If the requested skill is for internal or external work and whether that matches the flag on the contract
2. If the commodity code and unit of measure of the skill selected matches at least 1 line in the contract
3. If the contract has been restricted in any way for use, then the contract's restrictions must match on the following items in order to enable its use:
   A. The requester's web id.
   B. The requester's country, company, department, and/or user vicinity.
   C. The business unit of the request.

If in step 412, it is determined that the requester may not use or access the contract then in step 419 there are no restricted contracts displayed. In step 421 filtered suppliers are displayed and the algorithm executes step 434 as described, infra.

If in step 412, it is determined that the requester may use or access the contract then in step 415, it is determined if there is an entry in the rate matrix for the contract. Additionally, in step 415 it is determined if start/end dates of the contract cover the start/end date of the requested line item (i.e., the contract is active).

If in step 412, it is determined that the contract is not in the rate matrix and/or is not active then step 419 is executed.

If in step 412, it is determined that the contract is in the rate matrix and is active then in step 417, it is determined if the requester's country/company/business unit/service type is configured to a default to use a contract if only one contract is present.

If in step 417, it is determined that the requester's country/company/business unit/service type is configured to a default to use a contract if only one contract is present then in step 424, a filtered list of suppliers is generated and step 426 is executed as described, infra.

If in step 417, it is determined that the requester's country/company/business unit/service type is not configured to the default, then step 426 is executed.

In step 426 it is determined if the selected country is configured to require regional code filtering.

If in step 426 it is determined that the selected country is not configured to require regional code filtering then step 421 is executed as described, supra.

If in step 426 it is determined that the selected country is configured to require regional code filtering then in step 428 it is determined if the regional code matches the work location.

If in step 428 it is determined that the regional code does not match the work location then step 421 is executed as described, supra.

If in step 428 it is determined that the regional code does match the work location then in step 432, computing system 4a displays a list of suppliers for the requester to select from. In step 434 the requester selects suppliers from the list of step 432. In step 436, it is determined if a contract item is selected.

If a contract item is not selected in step 436, then in step 448, a default rate for the supplier and country/company/business unit/service type/region from the rate matrix is used. In step 450, a request document is transmitted to the selected suppliers.

If a contract item is selected in step 436, then in step 440 the contract rate is applied to the selected suppliers and step 450 is executed.

Figure 5:
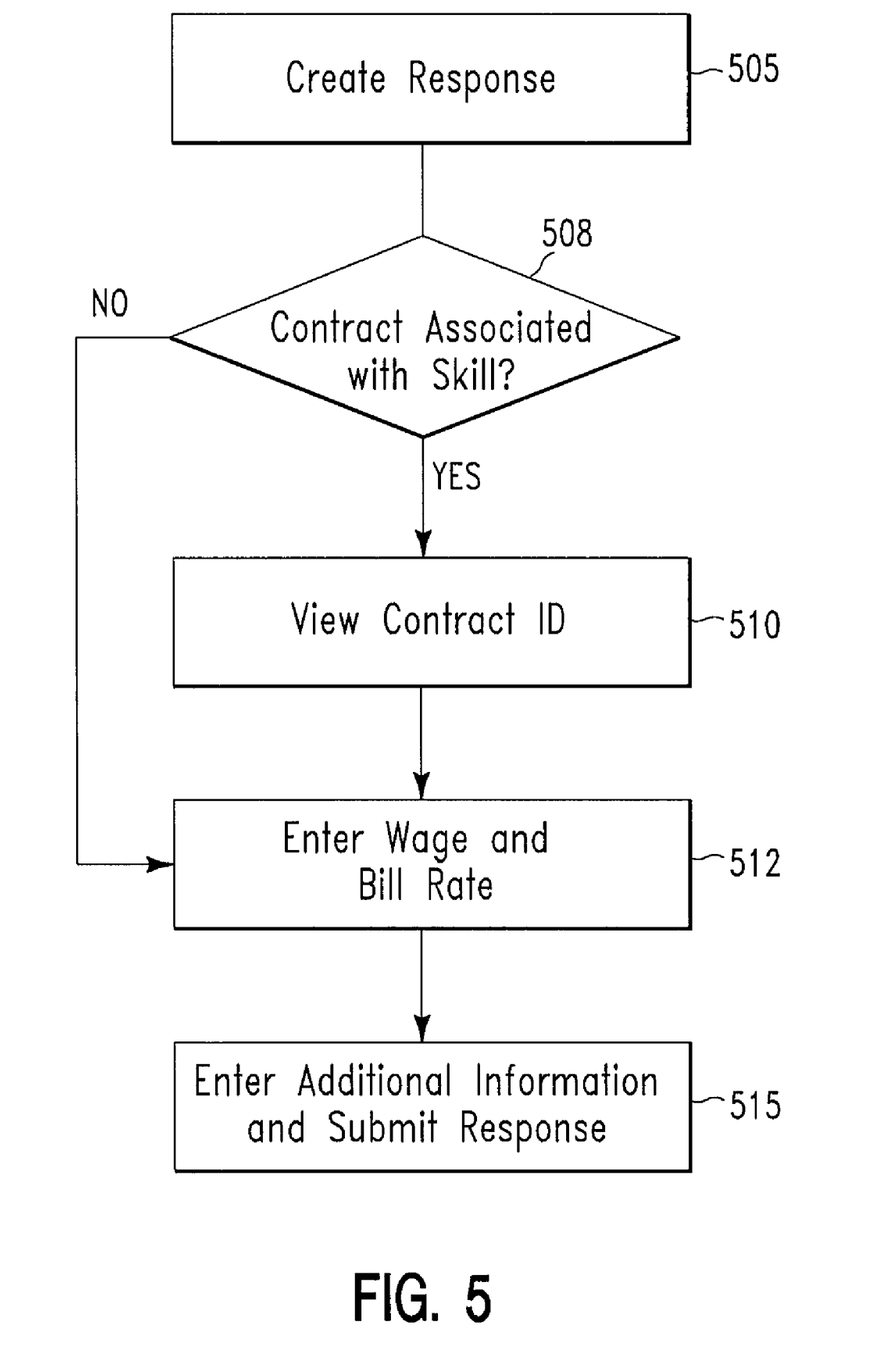
FIG. 5 illustrates a flowchart detailing a third step of FIG. 2, in accordance with embodiments of the present invention.

FIG. 5 illustrates a flowchart detailing step 39 of FIG. 2, in accordance with embodiments of the present invention. In step 505, a supplier generates responses to the line item request. This includes candidate information and optionally, a resume attachment. In step 508 it is determined if a contract item is associated with the line item.

If in step 508 it is determined that a contract item is not associated with the line item then step 512 is executed as described, infra.

If in step 508 it is determined that a contract item is associated with the line item then in step 510 the supplier views a description of the contract item and the associated contract number. In step 512, the supplier enters a bill rate and/or wage, based on configuration. In step 515, the supplier then enters any additional information required and submits the candidate so that the requester can review that information.

Figure 6:
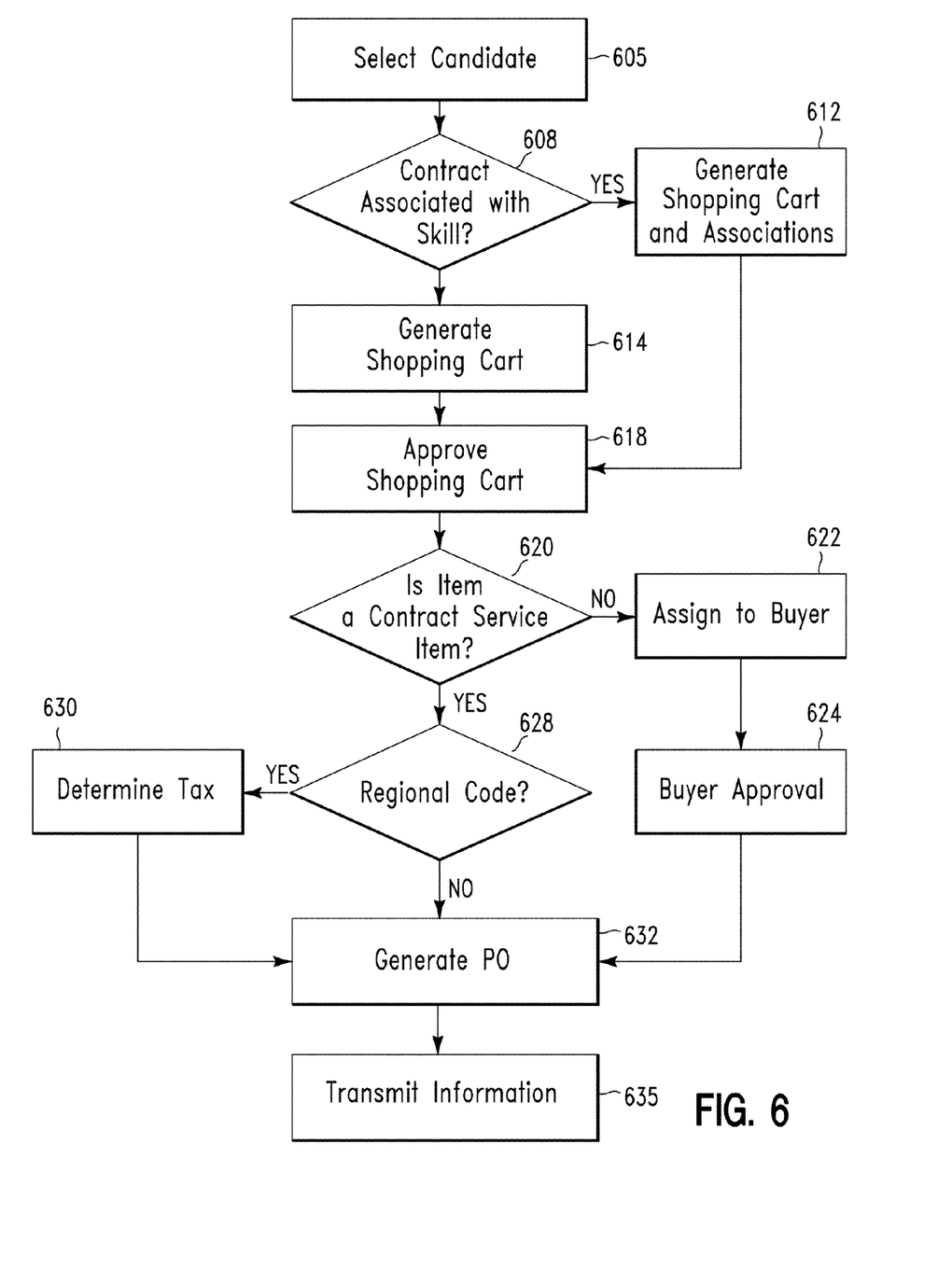
FIG. 6 illustrates a flowchart detailing a fourth step of FIG. 2, in accordance with embodiments of the present invention.

FIG. 6 illustrates a flowchart detailing step 40 of FIG. 2, in accordance with embodiments of the present invention. In step 605, the requester reviews any submitted candidates and identifies possible hires and submits the selected candidate. In step 608, it is determined if the contract is associated with the selected skill.

If in step 608 it is determined that the skill line item has a contract item associated with it (box 35 of FIG. 2), a shopping cart is generated (i.e., so that accounting may be assigned) with that information in step 612 and step 618 is executed as described, infra.

If in step 608 it is determined that the skill line item does not have a contract item associated with it, a shopping cart of services is generated using a standard rate in step 614. In step 618, the shopping cart goes through an approval process. In step 620, software application 16a generates a requisition and determines if there is a contract associated with the line item.

If in step 620, software application 16a determines that there is not a contract associated with the line item, then in step 622 the line item is assigned to a buyer for validation of the information. In step 624, the buyer approves a purchase order creation and step 632 is executed as described, infra.

If in step 620, software application 16a determines that there is a contract associated with the line item, then in step 628 software application 16a determines if a region code is assigned to the line item and if the country requires such processing.

If in step 628, software application 16a determines that a region code is not assigned to the line item, then step 632 is executed as described, infra.

If in step 628, software application 16a determines that a region code is assigned to the line item then in step 630 the region code is used to invoke special tax processing.

In step 632 a purchase order is generated and in step 635 the purchase order is transmitted to supplier.

The following two scenarios illustrate examples of implementation for implementing the algorithms of FIGS. 2-6 within system 2 for associating supplier contracts with selected skills.

Scenario 1

In scenario 1, a first requester would like to order Java programming skills and a contract is available for use.

The following configuration steps are performed:

1. A contract C123 is generated in system 2 for supplier "Acme Programming" in the US. The contract comprises one line item for Java programming skills.
2. The contract is inputted into computing system 4a where an administrator configures the contract to be used only by department "1234."
3. A services administrator configures the contract C123 into a rate matrix for Java programming at $40/hour.
4. The supplier "Acme Programming" is not configured anywhere else in system 2.
5. Supplier "ABC" is configured for Java programming in system 2 and has a rate matrix entry of $60/hour.

A first requester in dept. 1234 creates a line item for a Java programmer. On a supplier selection screen (e.g., interface terminal 8a in FIG. 1), the first requester is able to view both "ABC" and "Acme Programming" suppliers. Next to "Acme Programming" is a flag, indicating that there is an associated contract to be used.

A second requester in dept. 4567 creates a line item for a Java programmer. On the supplier selection screen, the second requester sees only "ABC," since he/she does not have access to the configured contract.

If the first requester in dept. 1234 selects Acme, since there is only 1 contract line item, then that item is associated with the requested skill. (If there were multiple contracts for Acme, then the first requester would have to select from a list of possible contracts).

On the supplier side (i.e., computing system 4b of FIG. 1), the supplier would (i.e., when responding to the Java programming request) see a description of the associated contract and its contract number. The supplier would then enter the bill rate and/or wage rate (i.e., per configuration), which is then compared to the configured contract rate in the rate matrix.

If the first requester in dept. 1234 selects the candidate submitted by Acme Programming, then the contract information is carried through the rest of the workflow from the services application, through a front-end purchasing system, to a backend system where the request goes "buyerless' and a purchase order is created and sent to Acme Programming.

Scenario 2

In scenario 2, requester in a country that comprises regional code filtering would like to order Java programming skills and a contract is available for use.

The following configuration steps are performed:

1. A contract C334 is created in system 2 for supplier "Acme Programming" in Canada. There is a line item for Java programming skills in Ontario for $40/hour and a line item for Java programming skills in New Brunswick for $35/hour.
2. The contract is fed into system 4a where the administrator configures the contract to be used only by department "5553."
3. A batch job runs to create entries in a table for the contract line items by region.
4. The administrator configures the contract C334 into a rate matrix for Java programming at $40/hour in Ontario and $35/hour in New Brunswick.
5. The supplier "Acme Programming" is not configured anywhere else in the services purchasing system.
6. Supplier "ABC" is configured for Java programming in the services purchasing system and has a rate matrix entry of $60/hour.

A requester in dept. 5553 creates a line item for a Java programmer. System 2 filters the list of possible contract items and associated suppliers based on a table that was built by a batch job and a regional code for where the work will be performed. If the work is to be performed in New Brunswick, then the requester will see both "ABC" and "Acme Programming" suppliers on a supplier selection screen with a contract indicator next to "Acme Programming". If the work is to be performed elsewhere (e.g., Saskatchewan), then the requester would only see "ABC" (since the special rate does not apply outside Ontario and New Brunswick).

If the requester in dept. 5553 had indicated that New Brunswick was the work location and then selects Acme, then the contract line item information is automatically assigned (since there is only one contract item that matches).

On the supplier side, the supplier would, when responding to the Java programming request, see a description of the associated contract and its number. The supplier would then enter the bill rate and/or wage (per configuration) which are compared to the configured contract rate in the rate matrix.

If the requester in dept. 5553 selects a candidate submitted by Acme Programming, then the contract information is carried through the rest of the workflow from the services application, through the front-end purchasing system, to a backend system where the request goes "buyerless' and a purchase order is created and sent to Acme Programming. The region code is used correctly to invoke the special tax-handling required.

Figure 7:
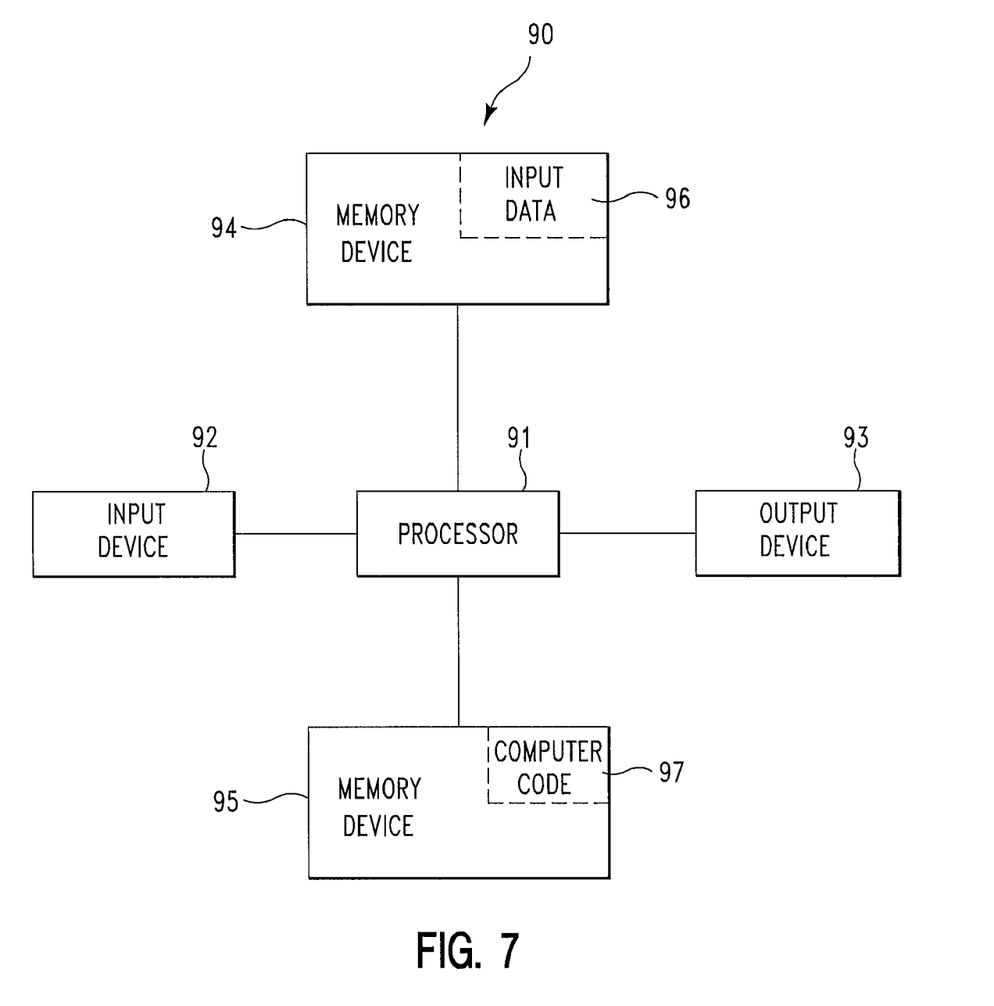
FIG. 7 illustrates a computer apparatus used for generating a service request comprising contract associations, in accordance with embodiments of the present invention.

FIG. 7 illustrates a computer apparatus 90 (i.e., computing apparatus 5a and 5b in FIG. 1) used for generating a service request comprising contract associations, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., algorithms of FIGS. 2-6) for generating a service request comprising contract associations. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 7) may comprise the algorithms of FIGS. 2-6 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be deployed, managed, serviced, etc. by a service provider who offers to generate a service request comprising contract associations. Thus the present invention discloses a process for deploying or integrating computing infrastructure, comprising integrating computer-readable code into the computer system 90, wherein the code in combination with the computer system 90 is capable of performing a method for generating a service request comprising contract associations. In another embodiment, the invention provides a business method that performs the process steps of the invention on a subscription, advertising, and/or fee basis. That is, a service provider, such as a Solution Integrator, could offer to generate a service request comprising contract associations. In this case, the service provider can create, maintain, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 7 shows the computer system 90 as a particular configuration of hardware and software, any configuration of hardware and software, as would be known to a person of ordinary skill in the art, may be utilized for the purposes stated supra in conjunction with the particular computer system 90 of FIG. 7. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A contract configuration method comprising:
    receiving, by a computing system from a requester, a command for creating a service request, said computing system comprising a memory device, said memory device comprising a list of skills, a first list of suppliers, and supplier contract data, said supplier contract data comprising contracts applicable to said first list of suppliers, said requester affiliated with a specified company, said contracts consisting of documents specifying agreements for suppliers of said first list of suppliers to provide candidates at specific rates;
    determining, by said computing system, which contracts of said contracts are regionally specific contracts;
    placing, by said computing system, restrictions on said contracts, said restrictions for allowing only specified parties to access said contracts;
    receiving, by said computing system from said requester, a selection of a first skill on said list of skills;
    filtering, by said computing system, a group of suppliers on said list of suppliers, said group of suppliers comprising potential suppliers for supplying candidates comprising said first skill, said group of suppliers filtered based on a plurality of business factors;
    generating, by said computing system, a second list of suppliers, said second list of suppliers identifying said group of suppliers;
    selecting, by said computing system, a group of contracts of said contracts, said group of contracts applicable to said second list of suppliers, said group of contracts selected based on a plurality of filtering factors;
    determining, by said computing system, that said restrictions allow said requester to access said group of contracts;
    generating, by said computing system, entries in a table for contract line items of said group of contracts, wherein said contract line items are sorted by regions;
    configuring, by said computing system, said group of contracts into a rate matrix for a specified skill with respect to different labor rates associated with said regions;
    associating, by said computing system, different tax rates with said different labor rates and said regions;
    generating, by said computing system, a selection list comprising identifiers for said group of contracts and said second list of suppliers;
    presenting, by said computing system for said requester, said selection list;
    receiving, by said computing system from said requester, a first selection of a first supplier and a first associated contract of said selection list;
    generating, by said computing system, a service request document, said candidate request document comprising said first selection of said first supplier, said first contract and said selection of said first skill, a first regional labor rate of said different labor rates, and a first tax rate of said different tax rates; and
    transmitting, by said computing system, said service request document to said first supplier.

2. The method of claim 1, further comprising:
    receiving, by said computing system from said first supplier in response to said service request document, a list of candidates, said list of candidates comprising candidates associated with said first skill;
    receiving, by said computing system from said requester, a selection of a first candidate of said list of candidates, said first candidate for performing services related to said first skill;
    generating, by said computing system, a purchase order for contracting said first candidate to perform said services, said purchase order comprising information from said first contract;
    transmitting, by said computing system to said first supplier, said purchase order; and
    receiving, by said computing system, authorization for contracting said first candidate.

3. The method of claim 1, wherein said memory device further comprises regional codes associated with a plurality of specified regions, and wherein said method further comprises:
    applying, by said computing system, a regional code of said regional codes to each contract item of said contracts that comprise said regionally specific contracts.

4. The method of claim 1, wherein said list of candidates further comprises bill rate data associated with said first supplier and wage rate data associated with said candidates.

5. The method of claim 1, wherein said authorization for contracting said first candidate is received from a buyer for said specified company.

6. The method of claim 1, further comprising:
    tracking, by said computing system, a period of time said first candidate performs said services related to said first skill.

7. The method of claim 1, wherein each business factor of said plurality of business factors is selected from the group consisting of a country of said requester, a business unit of said specified company, a work location for performing said services, and a category of said services.

8. The method of claim 1, wherein said first supplier is associated with a second contract of said group of contracts.

9. The method of claim 1, wherein each filtering factor of said plurality of filtering factors is selected from the group consisting of internal work for said specified company, external work for said specified company, a web identification for said requester, a country of said requester, a department of said requester, a vicinity of said requester, and a business unit requesting said creating said candidate request.

10. A computing system comprising a processor coupled to a computer-readable memory unit, said memory unit comprising instructions that when executed by the processor implement a contract configuration method, said method comprising:
   receiving, by said computing system from a requester, a command for creating a service request, said memory unit further comprising a list of skills, a first list of suppliers, and supplier contract data, said supplier contract data comprising contracts applicable to said first list of suppliers, said requester affiliated with a specified company, said contracts consisting of documents specifying agreements for suppliers of said first list of suppliers to provide candidates at specific rates;
   determining, by said computing system, which contracts of said contracts are regionally specific contracts;
   placing, by said computing system, restrictions on said contracts, said restrictions for allowing only specified parties to access said contracts;
   receiving, by said computing system from said requester, a selection of a first skill on said list of skills;
   filtering, by said computing system, a group of suppliers on said list of suppliers, said group of suppliers comprising potential suppliers for supplying candidates comprising said first skill, said group of suppliers filtered based on a plurality of business factors;
   generating, by said computing system, a second list of suppliers, said second list of suppliers identifying said group of suppliers;
   selecting, by said computing system, a group of contracts of said contracts, said group of contracts applicable to said second list of suppliers, said group of contracts selected based on a plurality of filtering factors;
   determining, by said computing system, that said restrictions allow said requester to access said group of contracts;
   generating, by said computing system, entries in a table for contract line items of said group of contracts, wherein said contract line items are sorted by regions;
   configuring, by said computing system, said group of contracts into a rate matrix for a specified skill with respect to different labor rates associated with said regions;
   associating, by said computing system, different tax rates with said different labor rates and said regions;
   generating, by said computing system, a selection list comprising identifiers for said group of contracts and said second list of suppliers;
   presenting, by said computing system for said requester, said selection list;
   receiving, by said computing system from said requester, a first selection of a first supplier and a first associated contract of said selection list;
   generating, by said computing system, a service request document, said candidate request document comprising said first selection of said first supplier, said first contract and said selection of said first skill, a first regional labor rate of said different labor rates, and a first tax rate of said different tax rates; and
   transmitting, by said computing system, said service request document to said first supplier.

11. The computing system of claim 10, wherein said method further comprises:
   receiving, by said computing system from said first supplier in response to said service request document, a list of candidates, said list of candidates comprising candidates associated with said first skill;
   receiving, by said computing system from said requester, a selection of a first candidate of said list of candidates, said first candidate for performing services related to said first skill;
   generating, by said computing system, a purchase order for contracting said first candidate to perform said services, said purchase order comprising information from said first contract;
   transmitting, by said computing system to said first supplier, said purchase order; and
   receiving, by said computing system, authorization for contracting said first candidate.

12. The computing system of claim 10, wherein said memory unit further comprises regional codes associated with a plurality of specified regions, and wherein said method further comprises:
   applying, by said computing system, a regional code of said regional codes to each contract item of said contracts that comprise said regionally specific contracts.

13. The computing system of claim 10, wherein said list of candidates further comprises bill rate data associated with said first supplier and wage rate data associated with said candidates.

14. The computing system of claim 10, wherein said authorization for contracting said first candidate is received from a buyer for said specified company.

15. The computing system of claim 10, wherein said method further comprises:
   tracking, by said computing system, a period of time said first candidate performs said services related to said first skill.

16. The computing system of claim 10, wherein each business factor of said plurality of business factors is selected from the group consisting of a country of said requester, a business unit of said specified company, a work location for performing said services, and a category of said services.

17. The computing system of claim 10, wherein said first supplier is associated with a second contract of said group of contracts.

18. The computing system of claim 10, wherein each filtering factor of said plurality of filtering factors is selected from the group consisting of internal work for said specified company, external work for said specified company, a web identification for said requester, a country of said requester, a department of said requester, a vicinity of said requester, and a business unit requesting said creating said candidate request.

19. A process for supporting computer infrastructure, said process comprising providing at least one support service for at least one of creating, integrating, hosting, maintaining, and deploying computer-readable code in a computing system, wherein the code in combination with the computing system is capable of performing a contract configuration method, said method comprising:
   receiving, by said computing system from a requester, a command for creating a service request, said computing system comprising a memory device, said memory device comprising a list of skills, a first list of suppliers, and supplier contract data, said supplier contract data comprising contracts applicable to said first list of suppliers, said requester affiliated with a specified company, said contracts consisting of documents specifying agreements for suppliers of said first list of suppliers to provide candidates at specific rates;

determining, by said computing system, which contracts of said contracts are regionally specific contracts;

placing, by said computing system, restrictions on said contracts, said restrictions for allowing only specified parties to access said contracts;

receiving, by said computing system from said requester, a selection of a first skill on said list of skills;

filtering, by said computing system, a group of suppliers on said list of suppliers, said group of suppliers comprising potential suppliers for supplying candidates comprising said first skill, said group of suppliers filtered based on a plurality of business factors;

generating, by said computing system, a second list of suppliers, said second list of suppliers identifying said group of suppliers;

selecting, by said computing system, a group of contracts of said contracts, said group of contracts applicable to said second list of suppliers, said group of contracts selected based on a plurality of filtering factors;

determining, by said computing system, that said restrictions allow said requester to access said group of contracts;

generating, by said computing system, entries in a table for contract line items of said group of contracts, wherein said contract line items are sorted by regions;

configuring, by said computing system, said group of contracts into a rate matrix for a specified skill with respect to different labor rates associated with said regions;

associating, by said computing system, different tax rates with said different labor rates and said regions;

generating, by said computing system, a selection list comprising identifiers for said group of contracts and said second list of suppliers;

presenting, by said computing system for said requester, said selection list;

receiving, by said computing system from said requester, a first selection of a first supplier and a first associated contract of said selection list;

generating, by said computing system, a service request document, said candidate request document comprising said first selection of said first supplier, said first contract and said selection of said first skill, a first regional labor rate of said different labor rates, and a first tax rate of said different tax rates; and transmitting, by said computing system, said service request document to said first supplier.

20. The process of claim 19, wherein said method further comprises:

receiving, by said computing system from said first supplier in response to said service request document, a list of candidates, said list of candidates comprising candidates associated with said first skill;

receiving, by said computing system from said requester, a selection of a first candidate of said list of candidates, said first candidate for performing services related to said first skill;

generating, by said computing system, a purchase order for contracting said first candidate to perform said services, said purchase order comprising information from said first contract;

transmitting, by said computing system to said first supplier, said purchase order; and receiving, by said computing system, authorization for contracting said first candidate.

21. The process of claim 19, wherein said memory device further comprises regional codes associated with a plurality of specified regions, and wherein said method further comprises:

applying, by said computing system, a regional code of said regional codes to each contract item of said contracts that comprise said regionally specific contracts.

22. The process of claim 19, wherein said list of candidates further comprises bill rate data associated with said first supplier and wage rate data associated with said candidates.

23. The process of claim 19, wherein said authorization for contracting said first candidate is received from a buyer for said specified company.

24. The process of claim 19, wherein said method further comprises:

tracking, by said computing system, o period of time said first candidate performs said services related to said first skill.

25. The process of claim 19, wherein each business factor of said plurality of business factors is selected from the group consisting of a country of said requester, a business unit of said specified company, a work location for performing said services, and a category of said services.

26. The process of claim 19, wherein said first supplier is associated with a second contract of said group of contracts.

27. The process of claim 19, wherein each filtering factor of said plurality of filtering factors is selected from the group consisting of internal work for said specified company, external work for said specified company, a web identification for said requester, a country of said requester, a department of said requester, a vicinity of said requester, and a business unit requesting said creating said candidate request.

28. A computer program product, comprising a computer readable storage device comprising a computer readable program code embodied therein, said computer readable program code being executed to implement a contract configuration method within a computing system, said method comprising:

receiving, by said computing system from a requester, a command for creating a service request, said computer usable medium further comprising a list of skills, a first list of suppliers, and supplier contract data, said supplier contract data comprising contracts applicable to said first list of suppliers, said requester affiliated with a specified company, said contracts consisting of documents specifying agreements for suppliers of said first list of suppliers to provide candidates at specific rates;

determining, by said computing system, which contracts of said contracts are regionally specific contracts;

placing, by said computing system, restrictions on said contracts, said restrictions for allowing only specified parties to access said contracts;

receiving, by said computing system from said requester, a selection of a first skill on said list of skills;

filtering, by said computing system, a group of suppliers on said list of suppliers, said group of suppliers comprising potential suppliers for supplying candidates comprising said first skill, said group of suppliers filtered based on a plurality of business factors;

generating, by said computing system, a second list of suppliers, said second list of suppliers identifying said group of suppliers;

selecting, by said computing system, a group of contracts of said contracts, said group of contracts applicable to said second list of suppliers, said group of contracts selected based on a plurality of filtering factors;

determining, by said computing system, that said restrictions allow said requester to access said group of contracts;

generating, by said computing system, entries in a table for contract line items of said group of contracts, wherein said contract line items are sorted by regions;

configuring, by said computing system, said group of contracts into a rate matrix for a specified skill with respect to different labor rates associated with said regions;

associating, by said computing system, different tax rates with said different labor rates and said regions;

generating, by said computing system, a selection list comprising identifiers for said group of contracts and said second list of suppliers;

presenting, by said computing system for said requester, said selection list;

receiving, by said computing system from said requester, a first selection of a first supplier and a first associated contract of said selection list;

generating, by said computing system, a service request document, said candidate request document comprising said first selection of said first supplier, said first contract and said selection of said first skill, a first regional labor rate of said different labor rates, and a first tax rate of said different tax rates; and transmitting, by said computing system, said service request document to said first supplier.

29. The computer program product of claim 28, wherein said method further comprises:

receiving, by said computing system from said first supplier in response to said service request document, a list of candidates, said list of candidates comprising candidates associated with said first skill;

receiving, by said computing system from said requester, a selection of a first candidate of said list of candidates, said first candidate for performing services related to said first skill;

generating, by said computing system, a purchase order for contracting said first candidate to perform said services, said purchase order comprising information from said first contract;

transmitting, by said computing system to said first supplier, said purchase order; and receiving, by said computing system, authorization for contracting said first candidate.

30. The computer program product of claim 28, wherein said computer usable medium further comprises regional codes associated with a plurality of specified regions, and wherein said method further comprises:

applying, by said computing system, a regional code of said regional codes to each contract item of said contracts that comprise said regionally specific contracts.

31. The computer program product of claim 28, wherein said list of candidates further comprises bill rate data associated with said first supplier and wage rate data associated with said candidates.

32. The computer program product of claim 28, wherein said authorization for contracting said first candidate is received from a buyer for said specified company.

33. The computer program product of claim 28, wherein said method further comprises:

tracking, by said computing system, a period of time said first candidate performs said services related to said first skill.

34. The computer program product of claim 28, wherein each business factor of said plurality of business factors is selected from the group consisting of a country of said requester, a business unit of said specified company, a work location for performing said services, and a category of said services.

35. The computer program product of claim 28, wherein said first supplier is associated with a second contract of said group of contracts.

36. The computer program product of claim 28, wherein each filtering factor of said plurality of filtering factors is selected from the group consisting of internal work for said specified company, external work for said specified company, a web identification for said requester, a country of said requester, a department of said requester, a vicinity of said requester, and a business unit requesting said creating said candidate request.

* * * * *